United States Patent [19]

Hudson, Jr.

[11] 3,771,655

[45] Nov. 13, 1973

[54] FILTRATION SYSTEM

[76] Inventor: Herbert E. Hudson, Jr., P.O. Box 1121, Gainesville, Fla. 32601

[22] Filed: Dec. 16, 1971

[21] Appl. No.: 208,555

[52] U.S. Cl.................. 210/108, 210/253, 210/264, 210/275
[51] Int. Cl........................................... B01d 23/24
[58] Field of Search.................... 210/108, 253, 264, 210/279, 275, 279

[56] References Cited
UNITED STATES PATENTS

| | | | |
|---|---|---|---|
| 2,199,891 | 5/1940 | Martin | 210/275 X |
| 2,679,319 | 5/1954 | Walker | 210/264 |
| 3,134,735 | 5/1964 | Greenleaf, Jr. | 210/264 |
| 3,547,270 | 12/1970 | Kass | 210/264 |

Primary Examiner—John Adee
Attorney—Burgess, Ryan and Wayne

[57] ABSTRACT

A filtration system is disclosed which includes an inlet passageway having restriction means therein. The restriction means may be an orifice plate or a small sized passage, and this determines the difference in the fluid levels between a supply conduit and the filter chamber into which the influent water is delivered. The restriction means also causes changes in level due to changes in flow rate to be more gradual, thus causing filtration rates to change more slowly. The use of the restriction means in the inlet passageway further allows a changing flow rate to be supplied to the system and also provides a declining flow rate through the system as the filtration progresses.

14 Claims, 5 Drawing Figures

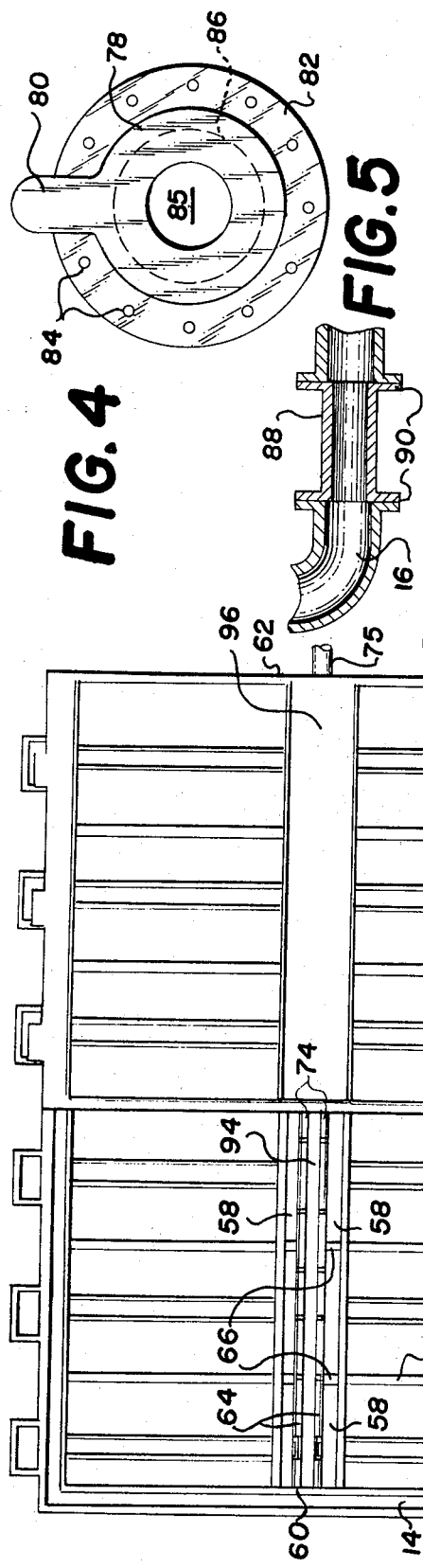
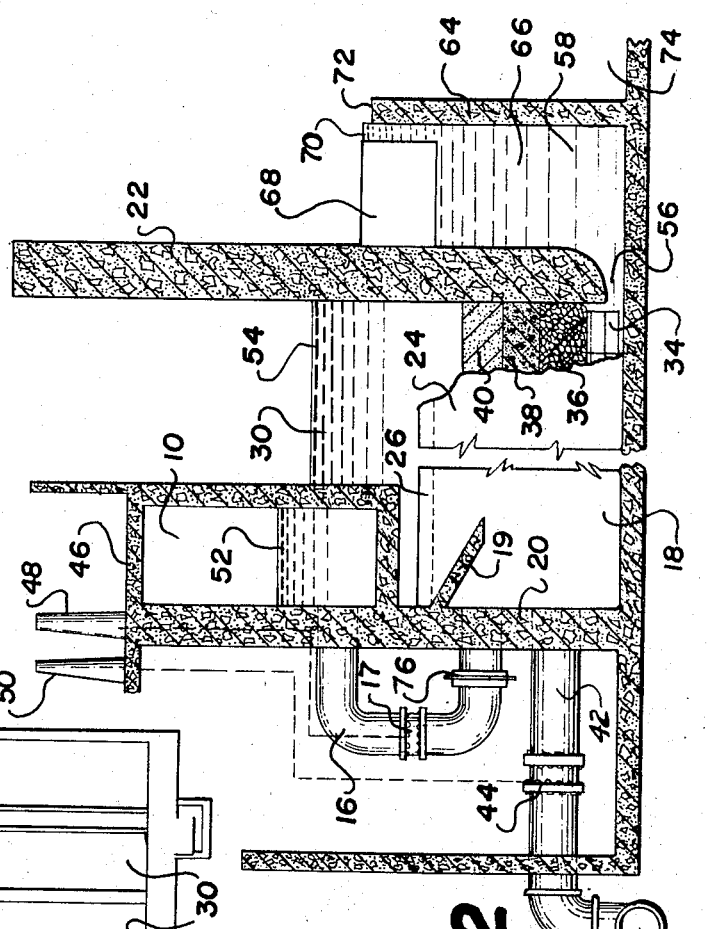
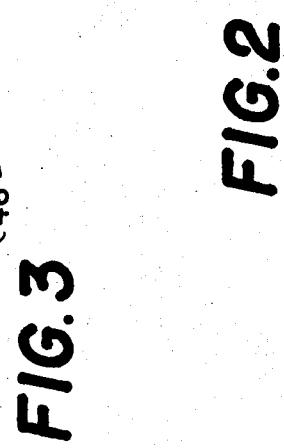
FIG. 4
FIG. 5
FIG. 2
FIG. 3

FILTRATION SYSTEM

BROAD STATEMENT OF INVENTION

The present invention relates to a filtration system and is particularly concerned with a water filtration system utilizing filter chambers wherein a restriction means is provided in the inlet supply.

DESCRIPTION OF THE PRIOR ART

In the prior art filtration operation it is known to use a plurality of filter chambers which can be separated hydraulically from each other so as to be periodically cleaned. This is known as backwashing the chamber, and this is necessary since the solids in the water to be filtered are deposited and clog the filter material in the chamber so that a reverse flow is necessary to wash away the deposited solids. During the filter operation flow regulation is required in the prior art, and a regulating system would be installed in the filtered water effluent conduit. With this regulating system the inlet conduit would supply influent water to all of the filter chambers so that the level of the water supply would be substantially the same as the level in the filter chamber. The filtration is effected in the prior art by allowing the influent water to pass through filter material forming lower part of the chamber, and the filtered water is then conveyed to a reservoir. In order to perform the backwashing operation the filter chamber is subjected to a pressurized source for flow reversal.

In the operation of a filtration system of this type, it is important that any change in the filtration rate be gradual as otherwise there may be a breakthrough of the suspended solids into the filtered effluent. A breakthrough takes place when the rate change is such that it forces the suspended solids through the filter material. Accordingly, in the prior art it was required to supply a complex regulating system for all of the separate filtering units so that they would function smoothly and allow any rate change to take place gradually. One provision was to utilize a storage chamber to "soak up" or accumulate any changes in flow rate, but such chambers were necessarily large in order to absorb the differences in a large filtration system. It was also necessary to utilize a complex arrangement of valves to provide the desired control of any rate change in the prior art. Accordingly, it would be desirable to have a filtration system which would avoid the large storage chambers and have a less complex flow regulating system.

DESCRIPTION OF THE INVENTION

The present invention provides a filtration system which has a comparatively simple flow regulation by providing such regulation in the inlet passageway.

In the present invention a filtration system is provided in which variable influent flow varies the level of the inlet influent liquid with respect to the level of the influent liquid in a filter chamber.

A further provision of the present invention is a filtration system in which the level of the effluent liquid in a weir chamber is less than the level of the influent liquid in the filter chamber due to the provision of restriction means in the inlet passageway.

There is also provided in the present invention a filtration system having restriction means in the inlet passageway so that only two valves are necessary to contol the inlet flow and backwash operation.

Another provision of the present invention is a filtration system having a restricting orifice plate in an inlet passageway so as to maintain the level of the influent liquid in the filter chamber lower than the level of the influent liquid in the inlet passageway.

A further provision of the present invention is a filtration system having individual restriction means provided in the inlet of each filter chamber passageway to divide the influent flow between the passageways of the various filter chambers in accordance with the capability of the filtration rate possible in an individual filter chamber.

A still further provision of the present invention is to provide a filtration system having restriction means in the inlet passageway for cushioning and regulating the effect of rate changes during filtration and obviating the necessity of a control system on the outlet passageway of a filter unit.

Another provision of the present invention is a filtration system having restriction means in the inlet passageway causing a decrease in the rate of filtration as the filter material in an individual filter chamber fills with suspended solids during filtration.

A further provision of the present invention is a filtration system having a simple valve arrangement allowing for backwash of a clogged filtration chamber.

A still further provision of the present invention is a filtration system providing smooth transition in rates of flow through the filter material in a filter chamber to prevent breakthrough and further provide a flared passageway for the filtered liquid to pass from the filter chamber to a weir chamber.

In a preferred embodiment of the invention an inlet passageway is provided for the influent liquid such as water which may have a variable supply flow. An inlet conduit connects the inlet passageway to the filtering chamber, and restriction means are provided in the inlet conduit. Such restriction means can be in the form of an orifice plate that can be changed as to size, or the restriction means may comprise a section of pipe smaller than an adjacent section. The level of the influent liquid in the filter chamber is lower than the level in the inlet passageway due to the provision of the restriction means. Transitions in the flow through the filter chamber are smooth due to the presence of this restriction means which helps to eliminate sudden changes in filtration rate that may be caused by a change in flow rate. The level of the filtered effluent that passes to a weir chamber is less than the level of influent in the filtering chamber, and this difference in level increases as the filter material becomes clogged with suspended solids. At a predetermined difference in the levels a backwashing operation is instituted for an individual filter chamber, so that the frequency of the backwashing operation is dependent upon the amount of solids collected on the filter material. In the present invention a difference in the levels between the inlet, filter chamber and weir chamber is maintained, and the level of the influent water in the filter chamber increases as the filter material clogs with the suspended solids. Each filter chamber is backwashed when the difference in levels reaches predetermined value which is equivalent to a loss of head for the flow of effluent.

After a filter chamber has been backwashed it is placed back in service by reversing the valve arrangements, and the provision of the restriction means in the inlet conduit helps to avoid an unduly quick resumption of flow in the backwashed chamber returning to service. The smoothing of flow through the filtration system of the present invention is further enhanced by a flared passageway underneath the filter material where the filtered liquid flows into the weir chamber.

The advantages of the present invention is the provision of a more simple filtration system in which abrupt changes in flow rate are avoided and in which the rate of filtration decreases as an individual filter chamber becomes clogged. This is provided primarily by the inclusion of restriction means in the inlet conduit of each filter chamber. Such arrangement avoids the necessity for a complex flow regulation as needed in the prior art in the outer conduit and further avoids the necessity of a storage chamber for absorbing a change of rate which would cause turbulent flow and breakthrough. The filtration system of the present invention will accept and properly filter any changing flow of influent liquid that is supplied. A difference in the liquid levels is maintained between the weir chamber, filter chamber and inlet passageway, and any change in the supply rate is cushioned due to the difference in levels and the restriction means of the system. As an individual filter chamber clogs, a loss of head develops which changes the levels and slows the flow through that individual filter chamber to avoid breakthrough, and backwashing takes place when a predetermined difference in levels is achieved. A further advantage of the present invention is that valve structure is required only at the inlet area to regulate the flow supply or the backwashing operation when necessary, and this valve arrangement is more simple than the prior art and more easily monitored and operated during use.

The nature of the present invention will become more clearly apparent and better understood from the following description and accompanying drawings in which:

FIG. 2 is a sectional view through an individual filter unit with part of the structure broken away for clarity;

FIG. 3 is a top plan view of the filter chambers arranged in line on either side of a central outlet passageway;

FIG. 4 is a view of an orifice plate utilized in the present invention; and

FIG. 5 is a view of a further embodiment of the present invention illustrating a restricted pipe section located in the inlet conduit for the filter chamber.

Figure 1:
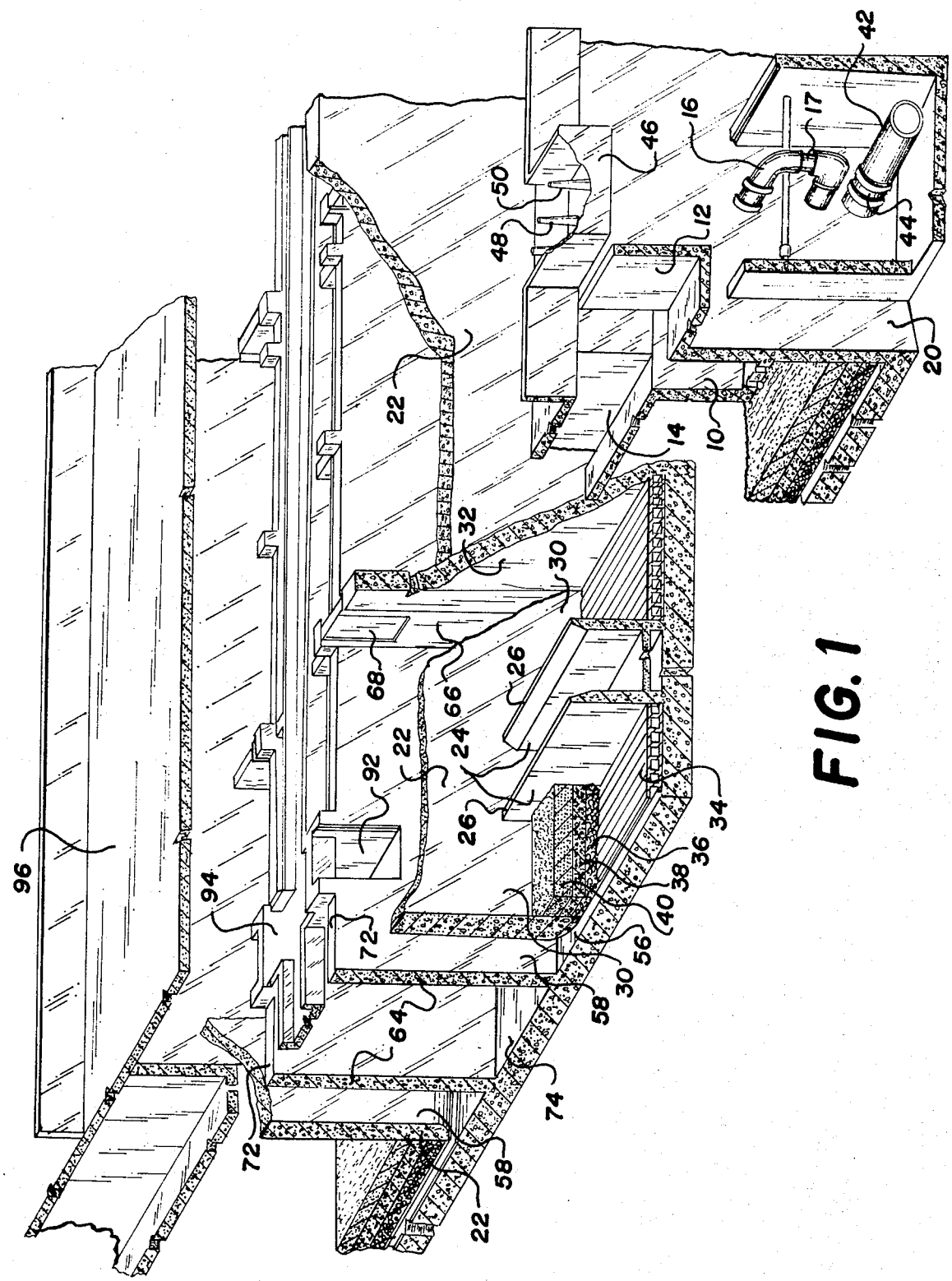
FIG. 1 is an isometric view of the filtration apparatus of the present invention with part of the structure broken away for clarity.

It will be understood that the accompanying drawings are merely diagrammatic illustrations, and reference should be made to the following description for a more detailed explanation of the structure involved.

Referring to FIGS. 1 and 2 an inlet passageway 10 is provided influent influen liquid such as water to be filtered that is supplied through an inlet pipe or flume 12. Passageway 10 is common to all filter chambers as shown in FIG. 3. In this connection a cross-over passageway 14 is provided that is connected to inlet 12 so that influent liquid can flow equally to all filter chambers of the system on both sides of a central passageway. The influent liquid with suspended solids therein passes from inlet passageway 10 through an inlet conduit 16 into a first chamber means shown as a filter gullet 18. The flow from passgeway 10 is against a deflector 19. As seen in FIGS. 1 and 2, gullet chamber 18 is defined by an outside wall 20, a floor 21, an inside wall 22 and side walls 24 with each side wall 24 having a top surface 26.

Gullet chamber 18 is located within a second chamber means which is illustrated as a pair of chambers 30 disposed respectively on either side of gullet chamber 18 and extending therealong and connected together above gullet chamber 18. Each chamber 30 is defined by outside wall 20, inside wall 22, one of the side walls 24 and a further side wall which is illustrated for one chamber 30 in FIG. 1 as side wall 32.

It is to be appreciated that only a single filtering unit is being described as shown in FIGS. 1 and 2, but the complete filtration system includes a plurality of such filtering units located side-by-side or in line as shown in FIG. 3 so that individual side walls 2 separate the side-by-side chamber means 30 and define the side wall for each. It is to be understood that the function of each filter unit is the same so that the description of its elements and operation will be made with reference to only the single unit as shown in FIGS. 1 and 2. The only difference with respect to the separate filtering units is in the sequence of the backwashing opertion which will be described hereinafter It is further pointed out that all of the filtering units discharge into a common passageway although the discharge rate of an individual filtering unit may vary as will also be explained hereinafter.

Chambers 30 receive the overflow from gullet 18 to filter out the suspended solids in the influent liquid, and for this purpose the lower portion of chamber 30 includes filters which may be in the form of perforated blocks 34 having positioned thereon layers of filter material. For example, as shown in FIG. 1 the lowermost layer 36 comprises gravel, the next highest layer 38 comprises sand and the uppermost layer 40 comprises anthracite.

The filtering operation of the influent liquid through gullet chamber 18 and filter chambers 30 will now be described. In inlet conduit 16 a first or inlet valve 17 is located for the control of the supply of influent into gullet chamber 18. Located below inlet conduit 16 is an outlet passageway 42 which is connected through outside wall 20 to gullet chamber 18. Outlet passageway 42 includes a second or outlet valve 44 for the control of liquid therethrough. On an upper platform 46 above wall 20 is positioned a first valve actuator 48 for operatng valve 17 and a second valve actuator 50 for oprating valve 44. In order to supply influent liquid to the filter chamber, valve 17 is opened and valve 44 is closed. This allows influent liquid to flow into gullet chamber 18 which is continually filled until the liquid flows over edges 26 into chambers 30 on either side. The level of the influent liquid supply is indicated by numeral 52 in FIG. 2, and this level is determined in part by the flow rate from inlet 12. The level of the influent liquid in chambers 30 is indicated by the numeral 54 in FIG. 2, and the difference between levels 52 and 54 is maintained by restriction means as will be explained hereinafter. The filtering of the suspended solids out of the influent liquid is provided by the liquid flowing downwardly through layers 40, 38 and 36 and then through the base 34 and further through a flared outlet passageway 56 at the bottom of inside wall 22. The suspended solids in the influent water are retained by the layers of filter material as is conventionally known, and only the purified or filtered water passes through flared outlet 56 into a weir chamber 58. As seen in FIGS. 1 and 2, weir chambr 58 functions as a third chamber means which is defined by the inside wall 22, end walls 60 and 62 and an inside wall 64. It will be seen from FIG. 3 where the filter chambers 30 are shown in their side-by-side relation that weir chamber 58 is common to all of the filter chambers ad separated into compartments by partitions 66 having upper sliding sections 68. Ordinarily sections 68 are positioned to allow the movement of effluent throughout the various weir chamber 58, but slides 68 can be closed to cooperate with a respective partition 66 to isolate a compartment within chamber 58 and the adjacent chamber 30 for de-watering, inspection, maintenance or other reasons.

The purified or filtered water passes through passageway 56 in effluent form to fill weir chambr 58 up to the level 70 as shown in FIG. 2. The wall 64 includes a top surface 72 shown as being slightly lower than level 70 so that the filtered effluent water flows over surface 72 into a central effluent passageway 74 from where the effluent water is conveyed via a discharge pipe 75 to a storage tank or transported via a pumping system (not shown) for distribution as needed. that is in inlet It can be seen from FIG. 2 that the level 54 of the influent water is higher than the level 70 of the effluent water, and the level 52 of the inlet influent water is the highest. The relationship of these levels as well as other features of the invention is determined by a restriction means 76 that is located in inlet passageway 16.

FIGS. 4 and 5 illustrate two different embodiments of restriction means that can appear in inlet conduit 16. FIG. 4 illustrates an orifice plate 78 having a lifting ear 80 that can be secured with appropriate gaskets (not shown) between a pair of flanges 82 (only one being shown in FIG. 4) by means of bolts 84. It is to be understood that lifting ear 80 is merely a convenience, and orifice plate 78 can be formed without it. The orifice plate 78 has a predetermined opening 85 which can be seen in FIG. 4 to be considerably smaller than the inner pipe surface 86 of inlet conduit 16. Accordingly, it wll be appreciated that orifice plate 78 causes a friction or head loss of the influent flow rate due to the smaller opening to produce the results that will be explained hereinafter. It will be further appreciated that different size orifice plates with different size openings can be inserted into inlet pipe 16 to change the flow characteristics of the system, and this is effected by loosening bolts 84 and exchanging orifice plates by lifting one plate out and placing another one in position by means of the lifting ear 80 in order to obtain the restriction desired.

FIG. 5 illustrates another embodiment of the restriction means wherein a restraining pipe 88 having a smaller inside diameter than the inside diameter of inlet conduit 16 is mounted therein by means of flanges 90. The restraining pipe fitting 88 can be varied as in the case of the orifice 78 by removing such mounting and replacing it with a different size restraining pipe in order to change the effect of the restriction means.

As shown in FIG. 1, cross-over passageways 92 are provided to connect weir chamber 58 on one side of effluent passageway 74 with weir chamber 58 on the other side of such pssagway. Although the filter units are shown as being located side-by-side with respect to each other in FIG. 3 and extending transverse to central effluent passageway 74, the system does not require that filter units be constructed on both sides of the effluent passageway 74. It is possible and in certain circumstances it may be preferable to construct filter units on only one side of the effluent passagway 74.

A walkway 94 is provided above effluent passageway 74, and an upper covering 96 is provided as shown in FIG. 1 and in the right-hand side of FIG. 3.

In the operation of the filtration system of the present invention it is to be appreciated that the top surface 72 extends throughout weir chamber 58 adjacent to all of the filter chambers 30. Accordingly, there is a common discharge over the surface 72 which provides the same discharge pressure for all filter units. As mentioned previously, the supply flow into the inlet passageway 10 can vary with the filtration system of this invention, and a minimum supply flow will cause the level 52 of inlet passageway 10 to be at a corresponding low level. However, during filtration due to restriction means 76, the liquid level 54 over the filter chamber 30 will always be less than level 52, but level 54 will always be higher than the level 70 which is determined by surface 72.

The restriction means that maintains the difference in the levels 52 and 54 can be provided either by orifice plate 78 or undersized pipe 88. The preferable embodiment is orifice plate 78 since it can be more easily removed and replaced with another orifice plate having a different size opening 85 when it is desired to change the flow rate.

It is understood that during the filtration operation an individual filter unit becomes clogged with suspended solids removed from the influent liquid. At the beginning of an operation when the filter material at the bottom of the filter chamber 30 is clean, the rate of flow will be higher than when the layers of filter material are dirty or clogged. Accordingly, it will be appreciated that the rate of flow at the same time is different through the various filter chambers 30 depending upon the amount of suspended solids clogging the filter material. Moreover, in any filter chamber of the present invention, the rate of flow is less because of restriction means 76 than would be the rate of flow if there were no restriction means in the inlet passageway. The advantage of having this decrease in flow rate is to restrain excessively rapid flow through the clean filter material, yet cause the clogged filter to run more slowly but with less restraint, in order to give the most effective removal of suspended solids. Under the prior art conditions where there was no restriction means in the inlet passageway, if there were a four-fold increase in the differential pressure through a clean filter, the rate of flow through the entire system would increase four-fold, which would be enough to impair the filter's effectiveness. However, with the location of the restriction means in the form of an orific plate in the inlet passageway, a pressure increase in the system of four-fold would result in a rate of flow increasing substantially less than four-fold, and in any ratio desired, as determined by the sizing of the orifice aperture.

An example can be given to further bring out the function of the inlet restriction. A rate of flow can be considered in which the difference between level 52 in the inlet passageway 10 and level 70 in the weir chamber 58 represents a difference of 4 feet. this produces an average rate of flow through the filter unit of Q units of volume per unit of time. Now it can be assumed that the head loss through a clean filter at rate Q is 1 foot of water. If there were little or no inlet loss with no restriction in the inlet passageway, a clean filter would begin operating at a rate of 4Q, which is an undesirably high rate. Accordingly, if for example it is desired to limit the initial rate of flow through a clean filter to 1.5Q, an inlet loss of 2.5 feet must be designed into the system. This is accomplished by providing the restriction means in outlet conduit 16 with a predetermined sized opening 85 so that the resultant level 54 in filter chamber 30 will be 1.5 feet above the level 70 in weir chamber 58 and 2.5 feet below level 52 in inlet passageway 10.

During the operation of the filtration system in the above example, an individual filter chamber 30 will become clogged so that its flow rate may decline to 0.5Q, which is a rate of flow that is 1/3 of the operational rate when the filter is clean. The head loss through the influent conduit 16, which is known to be proportional to the square of the flow rate, would then decline to one-ninth of 2.5 feet, or about 0.28 feet. Accordingly, level 54 in filter chamber 30 would rise so as to be 0.28 feet below level 52 in inlet passageway 10 and 3.72 feet above level 70 in weir chamber 58. Now in this connection it is desirable to have a filtration system in which the rate of filtration will diminish as the filter clogs because, if the filter chambers are operated at a constant rate, there is a tendency for the suspended solids to cause a breakthrough and penetrate the filter material as the solids collect, and this causes the quality of the effluent liquid to deteriorate during operation. It has been found that this breakthrough feature can be prevented or considerably reduced by causing the rate of flow through the filter chamber to decline during operation, which is provided by the restriction means already described.

At a predetermined interval it is necessary to clean or backwash each individual filter unit or set of chambers 30 in order to maintain a predetermined desired difference between liquid level 70 and liquid level 52. This time interval is dependent upon the amount of clogging in chamber 30 and may range from 12 to 60 or more hours, depending upon the condition of the influent liquid being filtered. Generally speaking, in a filtration system of the type being described herein, each filter unit is backwashed when the loss of head reaches a predetermined maximum. In the conventional prior art system an increase in the rate of flow through the system would cause a corresponding increase in the loss of head and necessitate a number of backwash operations in quick succession. In the filtration system of the present invention a more simple control feature is available in that the backwashing frequency is based on the difference in the height of liquid level 52 as compared to the height of liquid level 70. If this difference in height is designated H, and the length in hours of a filter run between backwashing is designated L, and the average rate of flow per filter unit at nominal capacity is Q, a numerical table can be calculated as follows:

| Q | H Feet of Water | Multiplier for L |
|---|---|---|
| 0.40 | 0.15–1.07 | 4.0 |
| 0.68 | 1.5–2.12 | 2.0 |
| 0.88 | 2.5–3.2 | 1.3 |
| 1.18 | 3.5–4.25 | 1.0 |
| 1.40 | 4.5–5.3 | 0.8 |
| 1.68 | 5.5–6.4 | 0.67 |
| 1.80 | 6.5–7.4 | 0.57 |
| 2.00 | 7.5–8.5 | 0.5 |

L can be better understood by explaining that if, for example, L is 24 hours when Q is 1.18 units, and then Q is changed to 2.0 units, L would become $0.5 \times 24$, or 12 hours. This would mean that, under these conditions, when Q is changed from 1.18 to 2.0 units, all filters should then be backwashed twice as frequently.

It is to be understood that the above calculated values are approximate and illustrative only, and for each individual filtration system a different set of figures may be calculated which will depend upon the frictional characteristics of the inlet passageway, the dimensions of the weir chamber, the characteristics of the filter material and the maximum allowable height of the influent liquid in the inlet passageway. Now if for any given rate of flow Q, the incoming water level H is maintained within the limits stated through increasing or decreasing the value of L, then the rate of flow may be increased to the maximum flow rate of the filtration system without necessitating immediate backwashing of the individual filter chambers. However, if, for example, the system is operating at a rate of flow Q, and the rate of flow is increased to 2Q, the scheduled frequency of backwashing must be revised to anticipate that individual filter runs will be shortened by about one-half. The filter chambers will be backwashed in a predetermined sequence with the frequency of the backwashing determined individually by the difference in levels as mentioned previously, and this is related to the rate of flow throughout the system.

It is to be appreciated that the various filter chambers 30 are arranged side-by-side as shown in FIG. 3, and they are individually taken out of operation for backwashing and returned to service when cleaned. For example, considering three side-by-side filter units A, B and C, each of which includes a pair of filter chambers 30, their backwashing will be determined individually. When filter A has been cleaned, it operates at the rate determined by the difference in the liquid level previously mentioned, and this will be the filter unit operating at the fastest rate until filter B is cleaned and placed back in service, thereby becoming the cleanest unit operating at the fastest rate. Thereafter, filter A operates at a somewhat slower rate as it becomes clogged, followed by filter unit C being cleaned, after which filter units A and B both slow down until it is the turn of filter unit A to be cleaned again by backwashing.

In the filtration system of the present invention, the rate of flow through the entire system can be increased merely by increasing the rate of influent liquid supplied through the inlet 12 to the inlet passageway 10. Because of the presence of restriction means 76 in the inlet conduit 16, liquid level 52 in the inlet passageway 10 will thereby rise, and there will be a corresponding rise in influent level 54 in the filter chamber and an increased flow rate throughout the system. It is understood that with the filtration system described that a satisfactory operation will result with any increase of influent level 52 up to its overflow level adjacent the platform 46.

An individual backwashing operation will now be described. It is understood that during ordinary filtration operation that the flow of the influent liquid is downward through the filter material layers 40, 38 and 36. The backwashing is effected by reversing the flow upwardly so as to wash out the suspended solids from the system by forcing them upwardly to flow out of chamber 30. This is accomplished by actuating valves 17 and 44 through the controls 48 and 50. The inlet conduit 16 is closed by valve 17, and the outlet conduit 42 is opened by valve 44. It is understood that this applies to a single filter unit having a pair of chambers 30, and the remainder of the filter units in the filtration system will continue their filtering operation. In the individual filter unit being backwashed, the closure of inlet valve 17 terminates supply flow to chamber 30 so that liquid level 54 recedes to approach liquid level 70 in weir chamber 58. Since the valve 44 is now open, the liquid level 54 continues to recede until it approaches surfaces 26 of inlet gullet 18. In the illustrated embodiment of the present invention inlet gullet 18 has been shown as located at the center of the filter unit, and this gullet is used to receive the water for the backwashing operation. However, it is also possible to provide backwash troughs located transversely to the gullet, or it is possible to locate the gullet as a channel along one edge of the filter chamber.

It will be understood from a consideration of FIG. 2 that with the recession of liquid level 54 to the level of top surface 26 with no change in the liquid level in weir chamber 58 that there will be a reverse flow of the liquid from chamber 68 through flared passageway 56 and upwardly through filter material layers 36, 38 and 40. This produces the backwash flow to carry the suspended solids over the surfaces 26 and outwardly through filter gullet 18 and outlet conduit 42. It will be understood that liquid level 70 is maintained substantially at the level shown in FIG. 2 by the effluent flow of the connected compartments in the weir chamber 58.

If desired in the filtration system, a supplemental scouring system can be incorporated which would involve fixed or rotating high-pressure water jets above or in the filter material, or a system to introduce air beneath the filter material to increase the agitation during backwashing.

When the filter unit is considered to be sufficiently clean by the backwashing operation, the outlet valve 44 is closed. However, liquid will continue to flow in the reverse manner to enter filter chamber 30 through flared passageway 56 so that gullet 18 will start to fill up and liquid level 54 will rise above surfaces 26 to approach liquid level 70 in weir chamber 58. At that time inlet valve 17 is opened to allow influent liquid to enter filter chamber 30 so that liquid level 54 will further rise to approach the working level as shown in FIG. 2. In the present invention following a backwash operation the filter unit proceeds gradually from a zero filtration rate to the desired starting filtration rate. It is important for proper filtration that the increase in influent flow proceeds slowly and smoothly to eliminate abrupt changes in flow as the liquid passes into the recently backwashed chamber. If the filter unit is started too quickly, poor quality water is produced for a period of one-half to several hours. Accordingly, the gradual opening and smoothness of operation is provided by restriction means 76 in the inlet passageway which increases the time interval for the filtration rate to proceed from zero to the desired rate. In addition, this time interval can be increased by partially or slowly opening inlet valve 17.

In the embodiment disclosed operated actuators 48 and 50 have been shown with connections to valves 17 and 44, and may be operated manually. The actuators are shown as being mounted on support platform 46 so that the controls for each filter unit are located together at each platform 46. This makes it possible under the described system for the operator to have the manual operation close at hand and at the same time be able to observe the progress of the backwash operation from that location. The filtration system can be built either with manual valves or with power-operated valves, which can be pneumatic, hydraulic or electric, and they may be controlled either locally or remotely. In addition, it is possible to operate the valve controls from an automatic control center based on variable time intervals or on the measurements of liquid level differential.

As mentioned previously, the filter materials in chamber 30 can comprise gravel layer 36 covered by sand layer 38 which is covered by coal or anthracite layer 40. However, the filter materials may comprise a layer of sand alone or anthracite alone or combinations of the various media with other natural or synthetic granular filter media materials. Further, while the embodiment disclosed incorporates a perforated block underdrain, other types of underdrains may be used, such as false bottoms and strainer systems, or other similar underdrains.

A further feature of the filtration system of the present invention is that level 70 of the effluent liquid in chamber 58 can be increased by placing weir chamber extension plates on top of surface 72. Although this feature is not illustrated in the drawings, it is understood that this represents an embodiment for increasing level 70 in order to change the backwash rate.

A further feature of the filtration system is the flared opening 56 formed at the bottom of inside wall 22. This flared opening can be a prefabricated unit or one carefully designed for smooth construction with re-usable forms, and the purpose is to reduce the inlet head loss and achieve smooth flow throughout the system. It is the restraint of inlet restriction means 76 that causes rate changes to take place gradually so that breakthrough will not occur in the filtration system illustrated.

From the above description it is clear that applicant has disclosed a novel and improved filtration system that provides a smoothly modulated flow therethrough without the use of large storage chambers or other complex control arrangements. The system of the present invention allows changes in the flow rate with the continuance of satisfactory filtering by the provision of the novel restriction means in the inlet passageway of each filter unit. A more simple regulating system is provided in the inlet passageway as compared to the prior art. Less construction is required with the present invention since there is no need for additional storage space to cushion and regulate the effect of rate changes, and a control system on the outlet flow passageway is no longer needed. The simplicity of the arrangement in the present invention permits more flexibility in the layout of filter units which may now be in any number and on one or both sides of the filtered water effluent passageway. Other features of the present invention involve the grouping of the controls at the inlet passageway where the operator can view the backwash, and a declining rate of filtration is provided as the clogging of the filter proceeds in order to regulate the filtration rate and obtain a longer filter run between backwash operations as compared to the prior art. A further advantage is the capacity to have a controllable slow start for the filter unit due to the provision of the restriction means which will prevent breakthrough or deterioration of the filter liquid.

Although inlet passageway 16 and outlet passageway 42 are shown in FIGS. 1 and 2 at the outside area of the filter unit, it is possible to position these passageways centrally of the unit or position one centrally of the unit and the other at the outside of the unit.

It will be understood that other changes and modifications may be made by those skilled in the art in the particular features of the system which has been described above for illustrative purposes without departing from the scope of the invention as defined by the following claims.

What is claimed is:

1. A filtration system comprising
   an inlet passageway for receiving liquid therein in influent form having suspended solids therein, the liquid being supplied at a predetermined level in said passageway;
   at least one first chamber means defined by an outside wall, an inside wall, and a pair of spaced side walls, each side wall being of a vertical height less than the vertical height of said outside and inside walls;
   an inlet conduit connecting said inlet passageway to said first chamber means via a connection in one of said walls;
   second chamber means comprising at least one pair of chambers disposed respectively on either side of said first chamber means, and each second chamber defined by said inside wall, said outside wall, one of said side walls and a further side wall having a greater height than the height of said one side wall, the influent liquid in said second chamber means having a level higher than said side walls and lower than said predetermined level;
   said second chamber means having a base comprising filter material adapted to remove the suspended solids from the liquid while allowing the liquid to pass therethrough in filtered form;
   a base section of said inside wall within said second chamber means formed as a passageway to allow the filtered liquid to pass therethrough;
   a third chamber means for receiving said filtered liquid, said third chamber means defined by said inside wall, a pair of end walls and a central wall, said central wall being lower than said inside wall and having a top surface determining the level of the filtered liquid in said third chamber means, said liquid level in said third chamber means being lower than said liquid level in said second chamber means;
   an outlet passageway provided adjacent said third chamber means to receive the liquid in effluent form passing over said top surface; and
   restriction means located in said inlet conduit to restrain the liquid flow therethrough and determine said liquid levels in said second and third chamber means.

2. A filtration system according to claim 1 in which said restriction means comprises an orifice plate mounted in said inlet conduit.

3. A filtration system according to claim 2 in which said orifice plate is removably mounted in said inlet conduit.

4. A filtration system according to claim 1 in which said restriction means comprises a section of said inlet conduit formed of a smaller size than an adjacent part of said conduit.

5. A filtration system according to claim 1 in which an outlet conduit is connected to said first chamber means via a connection in one of said walls to be selectively opened when said inlet conduit is closed to empty said first chamber means and backwash said filter material.

6. A filtration system according to claim 5 in which said difference in levels between said second chamber means and said inlet passageway decreases as said filter material clogs with suspended solids during filtration, and said filter material is subjected to the backwash when said difference is decreased to a predetermined value.

7. A filtration system according to claim 1 in which said difference in levels between said second chamber means and said inlet passageway is provided by said restriction means so that the liquid flow is restrained through said filter material in order to keep the rate of flow within limits of effectiveness of said filter material.

8. A filtration system according to claim 1 in which the liquid level in said inlet passageway is determined by the supply of influent liquid, the liquid level in said second chamber means is determined by said restriction means and the amount of suspended solids clogging filter material, and said difference in said levels determines a rate of filtration which decreases as said filter material clogs with suspended solids.

9. A filtration system according to claim 1 in which said third chamber means comprises a pair of elongated chambers spaced respectively adjacent said outlet passageway, said first chamber means comprises a plurality of chambers provided in two groups, one of said groups comprising chambers located side-by-side extending transversely to one of said elongated chambers and the other group comprising chambers located side-by-side extending transversely to the other elongated chamber.

10. A filtration system according to claim 9 in which means are provided to separate and isolate a compartment in said third chamber means.

11. A filtration system according to claim 9 in which conduit means are provided to interconnect said groups for liquid flow therethrough. 2

12. A filtration system according to claim 5 in which said inlet and outlet conduits are located adjacent each other on one side of said outside wall and manual means are positioned vertically thereabove to effect selective opening and closing of said conduits.

13. A filtration system according to claim 1 in which said passageway at the base of said inside wall is formed as an integral section to be attached to said inside wall, said integral passageway being flared outwardly towards said third chamber means to provide smooth flow therethrough.

14. A filtration system according to claim 1 in which said restriction means causes flow resistance so that said system commences operation smoothly and gradually.

* * * * *